(12) United States Patent
Gummadi et al.

(10) Patent No.: US 7,224,666 B2
(45) Date of Patent: May 29, 2007

(54) ESTIMATING FREQUENCY OFFSETS USING PILOT TONES IN AN OFDM SYSTEM

(75) Inventors: Srikanth Gummadi, Santa Rosa, CA (US); Peter A. Murphy, Santa Rosa, CA (US); Richard G. C. Williams, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1080 days.

(21) Appl. No.: 10/145,163

(22) Filed: May 13, 2002

(65) Prior Publication Data

US 2003/0210645 A1 Nov. 13, 2003

(51) Int. Cl.
*H04J 11/00* (2006.01)

(52) U.S. Cl. .................. 370/203; 370/338; 370/210

(58) Field of Classification Search ............... None
See application file for complete search history.

(56) References Cited

U.S. PATENT DOCUMENTS

| | | | |
|---|---|---|---|
| 5,228,062 A | 7/1993 | Bingham | |
| 5,363,103 A * | 11/1994 | Inkol | 342/13 |
| 5,732,113 A * | 3/1998 | Schmidl et al. | 375/355 |
| 6,549,561 B2 * | 4/2003 | Crawford | 375/137 |
| 6,549,583 B2 * | 4/2003 | Crawford | 375/260 |
| 6,930,995 B1 * | 8/2005 | Heinonen et al. | 370/350 |
| 6,940,933 B1 * | 9/2005 | Heinonen et al. | 375/354 |
| 2002/0065047 A1 * | 5/2002 | Moose | 455/63 |
| 2003/0016169 A1 * | 1/2003 | Jandrell | 342/357.12 |
| 2003/0072397 A1 * | 4/2003 | Kim et al. | 375/347 |

FOREIGN PATENT DOCUMENTS

| | | |
|---|---|---|
| GB | 2334836 A | 1/1999 |
| WO | 9519671 A1 | 7/1995 |
| WO | 9741672 A1 | 11/1997 |
| WO | 9819410 A2 | 5/1998 |

OTHER PUBLICATIONS

Zaman et al; Multitone Synchronization for Fading Channels; 1994 IEEE; pp. 946-949.

* cited by examiner

*Primary Examiner*—Bob A. Phunkulh
(74) *Attorney, Agent, or Firm*—Steven A. Shaw; W. James Brady; Frederick J. Telecky, Jr.

(57) ABSTRACT

A method for estimating carrier frequency offset (CFO) and sampling frequency offset (SFO) in an Orthogonal Frequency Division Multiplexing (OFDM) system having a plurality of pilot tones. The absolute phase angle for each pilot tone is measured, and estimates of the CFO and the SFO are derived using a weighted least-squares methodology. More particularly, the phase of each pilot tone is measured for a number (n) of symbol times; for each of the pilot tones, the slope of a phase angle change from symbol time to symbol time is estimated using a best least-squares fit of the measured phases to a straight line; and a weighted least-squares best-fit straight line is determined to find an estimated phase angle differential value ($\alpha(i)$) for each pilot tone; wherein a slope of the best-fit straight line yields an estimate of the SFO, and an intercept with the best-fit straight line yields an estimate of the CFO. The plurality of pilot tones may have frequencies which are symmetrically disposed about a reference frequency, and there may be four pilot tones. The OFDM communications system is suitably a wireless LAN (WLAN) implementing a standard such as IEEE 802.11a or HiperLAN/2. Corresponding apparatus is also described.

14 Claims, 4 Drawing Sheets

ESTIMATING FREQUENCY OFFSETS USING PILOT TONES IN AN OFDM SYSTEM

TECHNICAL FIELD

The present invention relates to multi-carrier communications systems, and more particularly to Orthogonal Frequency Division Multiplexing (OFDM) communications systems, including OFDM wireless communications systems.

BACKGROUND ART

Orthogonal Frequency Division Multiplexing (OFDM), also referred to as "multi-carrier modulation" (MCM) or "discrete multi-tone modulation" (DMTM), splits up and encodes high-speed incoming serial data, modulating it over a plurality of different carrier frequencies (subcarriers) within a communications channel to transmit the data from one user to another. The high-speed serial information is broken up into a plurality of lower-speed sub-signals that are transmitted simultaneously over the subcarriers in parallel.

Assuming that each subcarrier is a sinusoid, the effect of modulation on the spectrum of the modulated carrier is to expand it outward from a spectral line to a sinc function, centered on the subcarrier frequency and having zero power points ("zeroes") occurring at integer multiples of the modulation frequency (bit rate). A sinc function has the general form:

$$\text{sinc}(x) = \frac{\sin(x)}{x}$$

In the specific case of a subcarrier $\omega_S$ being modulated at a bit rate $\omega_M$, the frequency spectrum $F(\omega)$ is given by:

$$F(\omega) = \text{sinc}(\omega_M(\omega - \omega_S)) = \frac{\sin(\omega_M(\omega - \omega_S))}{\omega_M(\omega - \omega_S)}$$

which has a peak at $\omega_S$ and zeroes at integer multiples of $\omega_M$, both above and below $\omega_S$.

By spacing the subcarrier frequencies at intervals of the symbol frequency (bit rate), the peak power component of each modulated subcarrier lines up exactly with zero power components of the other modulated subcarriers, thereby providing orthogonality (independence and separability) of the individual subcarriers. This scheme can be applied to a large number of subcarriers spaced at the symbol frequency (bit rate), yielding good spectral efficiency with minimal interference between the subcarriers (inter-channel interference, or ICI).

An exemplary channel spacing for an OFDM communication system is illustrated in FIG. 1, which is a graph 100 illustrating spectral power (vertical axis, arbitrary units) versus frequency (horizontal axis, arbitrary units), showing the spectra of three modulated subcarriers 102, 104 and 106. In the example of FIG. 1, the subcarriers 102, 104 and 106 are modulated at a bit rate equivalent to 300 frequency "units", as indicated on the horizontal axis of the graph. The first subcarrier 102 has a center frequency of 100 "units" relative to a reference "zero frequency", and has zero power points (zeroes) occurring at 400, 700 and 1000 frequency units. The second subcarrier 104 has a center frequency of 400 frequency units relative to the reference zero frequency, and has zeroes occurring at 100, 700 and 1000 frequency units. The third subcarrier 106 has a center frequency of 700 frequency units relative to the reference zero frequency, and has zeroes occurring at 100, 400 and 1000 frequency units. Each subcarrier's peak occurs at its center frequency, which aligns only with zero power points of the other subcarriers.

Due to the consistent channel spacing, subcarriers can be referred to by subcarrier number "i", where "i" is an integer which can be positive, negative, or zero. Accordingly, the "$i^{th}$" subcarrier $SC_i(t)$ can be expressed as follows:

$$SC_i(t) = \cos[(\omega_c + i\omega_s)t]$$

where:

$\omega_c$ is the overall carrier reference frequency for the OFDM channel $\omega_s$ is the OFDM channel spacing frequency FIG. 2 is a block diagram illustrative of portion of an exemplary OFDM transmission system 200. In the OFDM transmission system 200 of FIG. 2, a high-speed input data stream 202 is presented at an input of a Serial-to-Parallel conversion block 204, which breaks up and encodes the high-speed data input stream 202 into a number of lower-speed data streams 206a, 206b, 206c, and 206d. Each lower-speed data stream 206a, 206b, 206c, and 206d modulates a respective subcarrier 208a, 208b, 208c, and 208d, to produce a respective modulated subcarrier 210a, 210b, 210c and 210d. The modulation rate $(\omega_M)$ and subcarrier spacing $(\omega_s)$ is chosen so that the modulated subcarriers 210a, 210b, 210c and 210d are orthogonal, as shown and described hereinabove with respect to FIG. 1. The modulated subcarriers 210a, 210b, 210c and 210d are then combined in a combining block 212 (shown as a summing element) to produce a composite OFDM output signal 214.

This technique of transmitting data simultaneously over multiple, orthogonal subcarriers permits OFDM-based wireless LANs (WLANs) and other OFDM-based communications networks to operate at higher aggregate data rates than is possible using other schemes with similar receiver complexity. For example, the OFDM-based wireless LAN standard specified by the Institute of Electrical and Electronic Engineers (IEEE Std 802.11a-1999—Supp. to IEEE Std 802.11-1999—"High-speed Physical Layer in the 5 GHz Band"; hereinafter "IEEE 802.11a") can operate at data rates of up to 54 Mbps, approximately double the rate achievable using direct-sequencing techniques. In addition, RF signals that interfere with an OFDM signal will only destroy the portion of the OFDM transmitted signal related to the frequency of the interfering signal. Through the use of error-correcting codes (ECC), the damage associated with the destroyed portion of the OFDM transmitted signal can often be reconstructed.

An inherent advantage of OFDM is its low multi-path distortion (delay spread), resulting from the fact that high-speed data is sent in parallel over a plurality of subcarriers at relatively low data rates. Because of the lower data rate transmissions, individual symbol (bit) times are longer and differential signal delays due to multi-path reception are not nearly as significant as they would be in a single-channel system utilizing a higher data rate, wherein the symbol times would be shorter.

Many wired and wireless standards bodies have adopted OFDM for a variety of applications. For example, OFDM is the basis for the global standard for asymmetric digital subscriber line (ADSL) and for digital audio broadcasting (DAB) in Europe. In wireless networking applications, OFDM forms the basis of IEEE 802.11a and HiperLAN/2, which implement OFDM similarly. Their main differences lie in their available rates and preambles.

The IEEE 802.11a standard specifies an OFDM physical layer (PHY) that splits an information signal across 52 separate subcarriers to provide transmission of data at a rate of 6, 9, 12, 18, 24, 36, 48, or 54 Mbps. The 6-, 12-, and 24-Mbps data rates are mandatory for all IEEE 802.11a compliant systems. Four of the subcarriers are pilot tones (reference tones modulated with a known, repeating data sequence) that OFDM systems use as a reference to disregard frequency or phase shifts of the signal during transmission. A predetermined pseudo-random binary sequence is transmitted over the pilot subcarriers to prevent the generation of spectral lines. The remaining 48 subcarriers provide separate wireless pathways for sending the information in a parallel manner. The resulting subcarrier frequency spacing is 0.3125 MHz (for a 20 MHz channel with 64 possible sub-carrier frequency slots).

SUMMARY OF THE INVENTION

According to the invention, a method is provided for estimating carrier frequency offset (CFO) and sampling frequency offset (SFO) in an Orthogonal Frequency Division Multiplexing (OFDM) system having a plurality of pilot tones.

According to an aspect of the invention, the method comprises:

measuring an absolute phase angle for each pilot tone; and fitting a straight line to the phase angles to derive estimates of the CFO and the SFO.

According to another aspect of the invention, the method comprises:

a. measuring phases of each of the pilot tones for a number (n) of symbol times;

b. for each of the pilot tones, estimating the slope of a phase angle change from symbol time to symbol time using a fit of the measured phases to a straight line; and c. determining a best-fit straight line to find an estimated phase angle differential value ($\alpha(i)$) for each pilot tone;

wherein a slope of the best-fit straight line yields an estimate of the SFO, and an intercept with the best-fit straight line yields an estimate of the CFO.

According to another aspect of the invention, the method comprises:

making phase angle measurements for each of the pilot tones over a number (n) of symbol times;

calculating a least-squares best-fit (LSBF) straight line for each of the pilot tones;

determining the slopes of the LSBF straight lines;

using the slopes of the LSBF straight lines to estimate phase angle differential values for each pilot tone;

using the estimates of phase angle differential values, producing a weighted LSBF straight-line, wherein the weighting is based upon a strength of the phase angle differential values estimates;

using the slope of the weighted LSBF straight line, estimating the SFO; and using the intercept of the weighted LSBF straight line, to estimating the CFO.

According to another feature of the invention, the plurality of pilot tones have frequencies which are symmetrically disposed about a reference frequency.

According to another feature of the invention, there are four pilot tones.

According to another feature of the invention, the OFDM communications system is a wireless LAN (WLAN).

Corresponding apparatus is also disclosed.

DETAILED DESCRIPTION OF THE INVENTION

Figure 1:
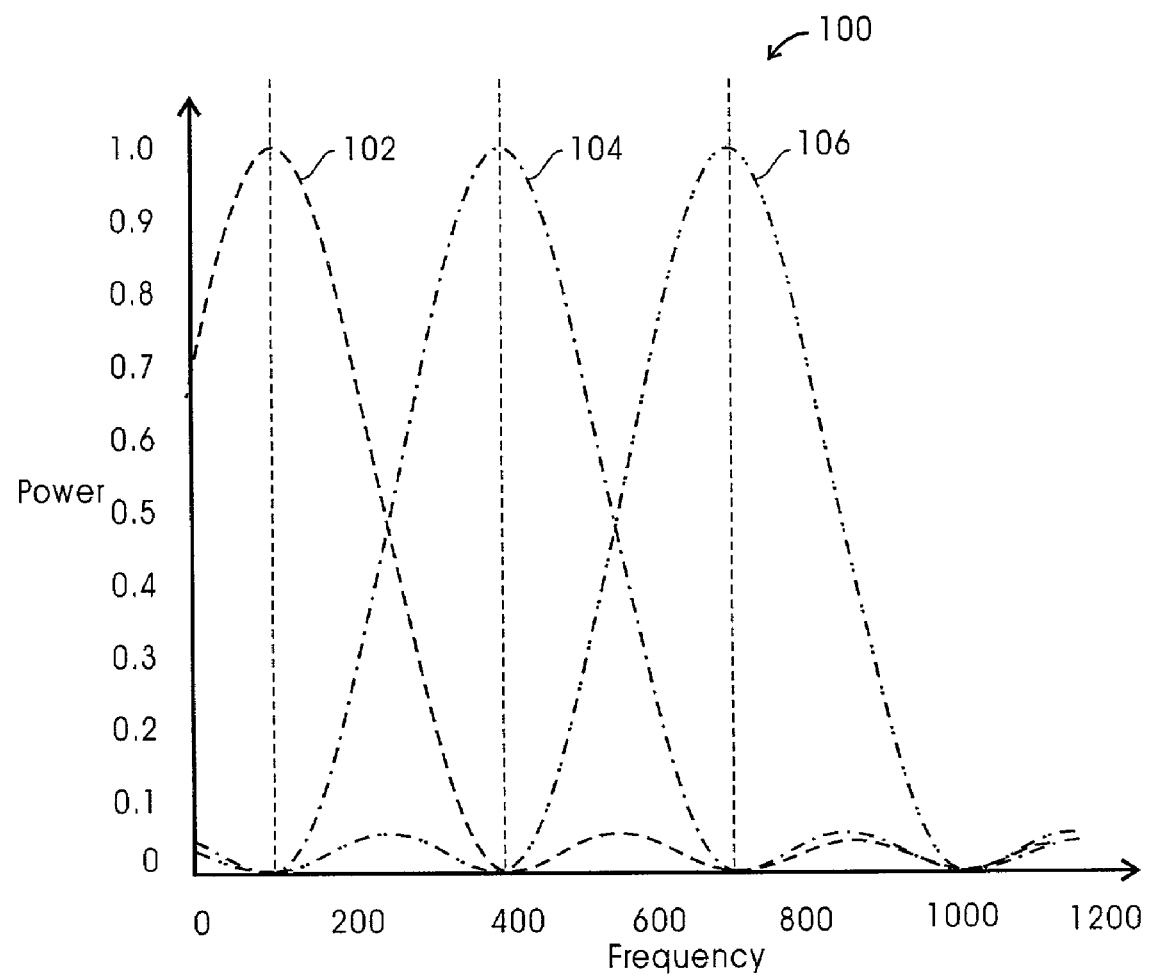
FIG. 1 is a graph of frequency spectra of a plurality of orthogonally modulated subcarriers, in accordance with the prior art.
Figure 2:
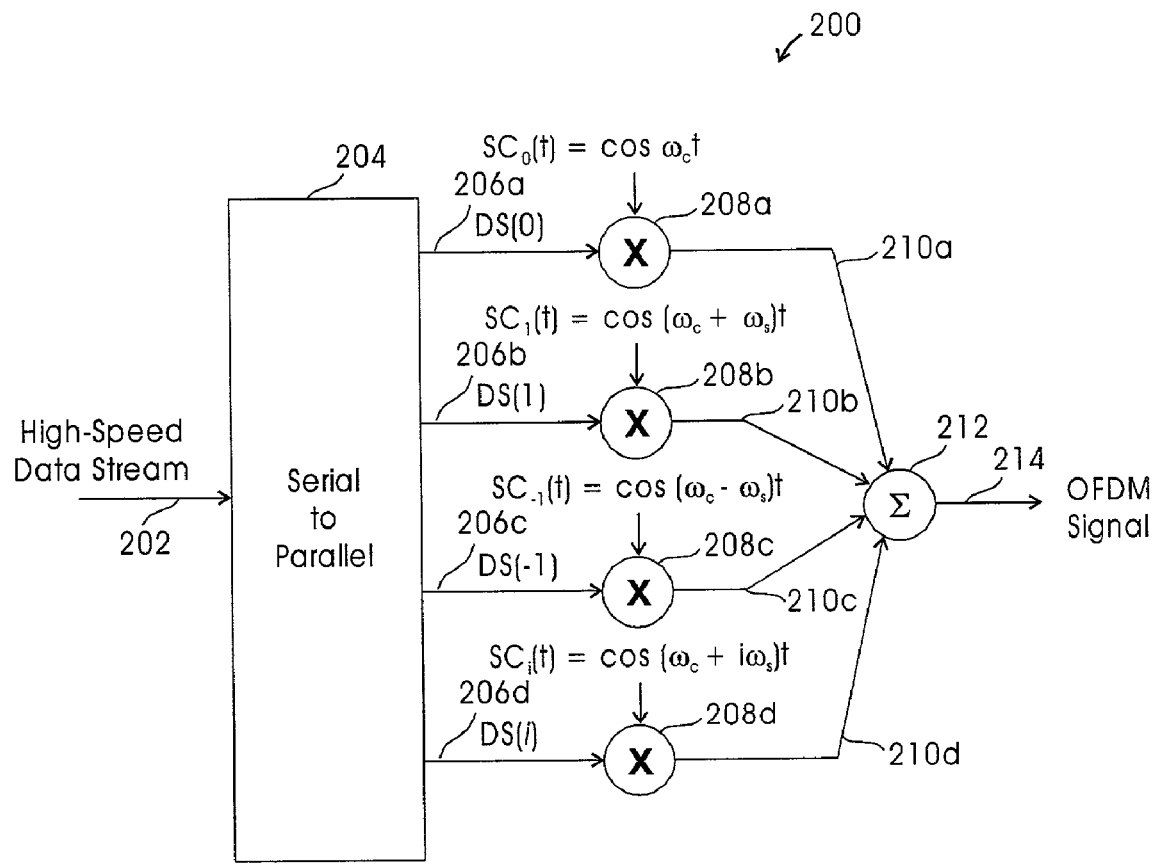
FIG. 2 is a schematic block diagram of a typical OFDM transmission system, in accordance with the prior art.

The present invention relates to multi-carrier communications systems, and more particularly to OFDM (Orthogonal Frequency Division Multiplexing) communications systems, including OFDM wireless communications systems. A general description of such systems has been presented hereinabove. Prior to discussing the invention, it is useful to discuss some particular nuances of OFDM-based communications systems.

OFDM-based communications systems such as 802.11a and HiperLAN/2 are very sensitive to frequency offsets between an OFDM transmitter and an OFDM receiver. Any such offsets cause the receiver to perceive constantly drifting phase in the received signal. The two main types of frequency offsets are: Sampling Frequency Offset (SFO), or mismatch between sampling frequencies of clocks at the OFDM transmitter (TX) and the OFDM receiver (RX); and Carrier Frequency Offset (CFO), or mismatch between the frequencies of the oscillator clocks (subcarrier frequencies) at the OFDM transmitter (TX) and the OFDM receiver (RX). These frequency offsets must to be estimated and compensated for if effective communication is to be accomplished between the OFDM transmitter (TX) and the OFDM receiver (RX).

Carrier frequency offset (CFO) results in a common frequency shift in all of the subcarriers as seen at the receiver. This produces a continuous, predictable phase drift common to all of the subcarriers, such that at an $n^{th}$ symbol time, the accumulated phase angle error due to CFO for the $i^{th}$ subcarrier can be expressed as follows:

$$\theta_n(i)_{CFO} = 2 \cdot \pi \cdot n \cdot f_C \cdot T_S$$

where:

$f_C$ is the carrier frequency offset; and $T_S$ is the symbol period (4 μs for IEEE 802.11a)

It should be noted that the phase angle error due to CFO is independent of the number (i) of the subcarrier. All subcarriers experience the same phase angle drift.

Sampling frequency offset (SFO) produces a phase angle error dependent upon both the symbol time "n" and the subcarrier number "i" and can be expressed as follows:

$$\theta_n(i)_{SFO} = 2 \cdot \pi \cdot n \cdot i \cdot \frac{f_S}{F_S}$$

where:
$f_S$ is the sampling frequency offset; and
$F_S$ is the sampling frequency Accordingly, the overall phase angle error of any given subcarrier is given by:

$$\theta_n(i) = \theta_n(i)_{CFO} + \theta_n(i)_{SFO}$$
$$= 2 \cdot \pi \cdot n \cdot \left( f_C \cdot T_S + i \frac{f_s}{F_S} \right)$$
$$= 2 \cdot \pi \cdot n \cdot \alpha(i)$$

where:
$\alpha(i)$ is the composite phase angle error per-symbol-time, measured in full cycles (i.e., $\alpha(i)=0.5$ corresponds to 180 degrees phase angle error per symbol time)

OFDM systems provide pilot tones (typically, 4 pilot tones are provided) to establish known phase and frequency references by which an OFDM receiver can detect, estimate and compensate for CFO and SFO. IEEE 802.11a specifies four pilot tones at frequency subcarrier numbers (subchannel numbers) −21, −7, 7 and 21, relative to the reference "zero frequency", or center frequency, for the IEEE 802.11a channel. (Subcarrier spacing in IEEE 802.11a is 0.3125 MHz, meaning that subcarrier number −7 is at a frequency 2.1875 MHz below the center frequency of the IEEE 802.11a channel).

In a typical OFDM system, the problems of SFO and CFO are handled by determining the incremental phase angle difference (phase angle differential) $\alpha(i)$ of each pilot tone from one OFDM symbol to the next (i.e., one symbol time, n=1) by demodulating each of the four pilot tones. (Note: $\alpha(i)$ is expressed in full cycles, i.e., $\alpha(i)=0.5$ corresponds to a 180 degree phase angle.) For IEEE 802.11a, this yields four discrete $\alpha(i)$ values: $\alpha(-21)$, $\alpha(-7)$, $\alpha(7)$ and $\alpha(21)$, corresponding to the inter-symbol phase angle for the pilot tones at slots −21, −7, 7 and 21, respectively. Since the four pilot tones are symmetrical about the center frequency, their sum is four times the inter-symbol phase angle of the center frequency. That is:

$$\sum_i \alpha(i) = 4 f_c T_s$$

where $i \in \{-21, -7, 7, 21\}$

Having determined the carrier frequency offset $f_C$ (CFO), the SFO $f_S$ can be estimated from any of the individual $\alpha(i)$ values according to the following equation:

$$\alpha(i) = \left( f_c T_s + i \frac{f_s}{F_s} \right)$$

These values can then be used to compensate for SFO and CFO to facilitate reception.

One problem with this technique is that it is relatively noise sensitive, and gives equal weight to all pilot tones, regardless of their relative quality and strength. This limits the quality of the CFO and SFO estimates, and limits the overall noise performance of the OFDM system.

The present inventive technique takes a different approach to CFO and SFO estimation and compensation. Rather than estimating the inter-symbol phase angle change for each of the pilot tones, the absolute phase angle of each pilot tone is measured directly, and a straight line is fit is used to derive estimates of the CFO and SFO. In an example embodiment, a weighted least-squares methodology is used to fit the straight line for deriving the CFO and SFO estimates. The least-squares weighting can be based upon the relative strengths (quality) of the pilot tones, thereby weighting strong tones more than weak ones, consequently producing better estimates of the CFO and SFO. This method has the further advantage of working directly on phase angles, rather than on phase angle differences, thereby reducing sensitivity to noise. Of course, the weights could all be set to one, which has the effect of not weighting the pilot angles. All such embodiments (including setting the weights to one) are considered to be "weighed" for purposes of the present disclosure, and are intended to be covered by the appended claims.

According to a preferred embodiment, CFO and SFO are estimated by performing the following steps:

a. Determining (measuring) the phases of each of the four pilot tones for a number of symbol times "n".

b. For each of the four pilot tones, estimate the slope of the phase angle change from symbol time to symbol time (i.e., the rate of phase angle drift) using a best least-squares fit of the measured phases to a straight line. Use the slope of the straight line to estimate $\alpha(i)$ (the per-symbol-time change in phase angle for each of the pilot-tone subcarriers).

c. Determine a weighted least-squares best-fit straight line to find the slope and intercept of the estimated $\alpha(i)$ values. The $\alpha(i)$ values should be weighted based upon their relative strength (signal quality), such that weak measurements are weighted less heavily than strong measurements. The slope of the best-fit straight line yields an estimate of $f_S/F_S$, and the intercept yields an estimate of $f_C T_S$.

Figure 3:
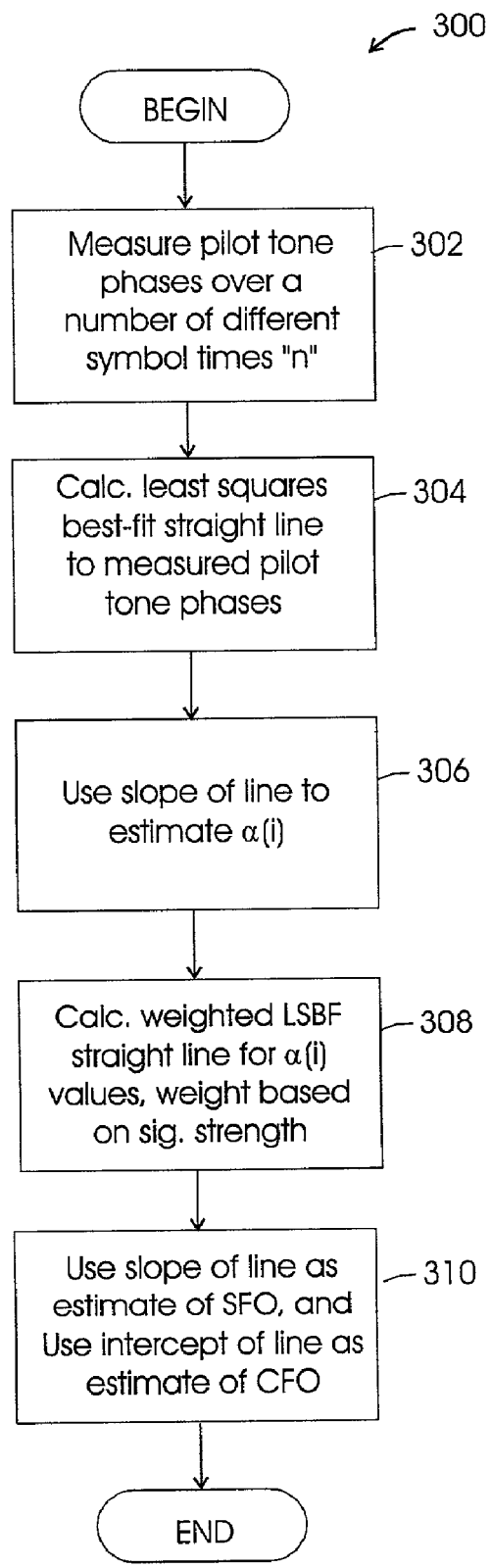
FIG. 3 is a flowchart of a technique for estimating carrier frequency offset (CFO) and sampling frequency offset (SFO), in accordance with the invention.

This technique is illustrated in flowchart form in FIG. 3.

FIG. 3 is a flowchart 300 illustrating an embodiment of the present inventive technique.

In a first step 302, phase angle measurements are made for each of the pilot tones over a number of symbol times ("n"). The phase angles of these pilot tones include components of both CFO and SFO.

In a next step 304, a least-squares best-fit (LSBF) straight line is calculated for each pilot tone.

In a next step 306, the slopes of the LSBF straight lines determined in the previous step 30 are used to estimate $\alpha(i)$ for each pilot tone.

In a next step 308, the $\alpha(i)$ values determined in the previous step 306 are used to produce a weighted LSBF straight-line, with the weighting based upon the strength of the $\alpha(i)$ estimates.

In a next step 310, the slope of the weighted LSBF straight line is used to estimate SFO (the slope is $f_S/F_S$) and the intercept is used to estimate CFO (the intercept is $f_C T_S$).

Figure 4:
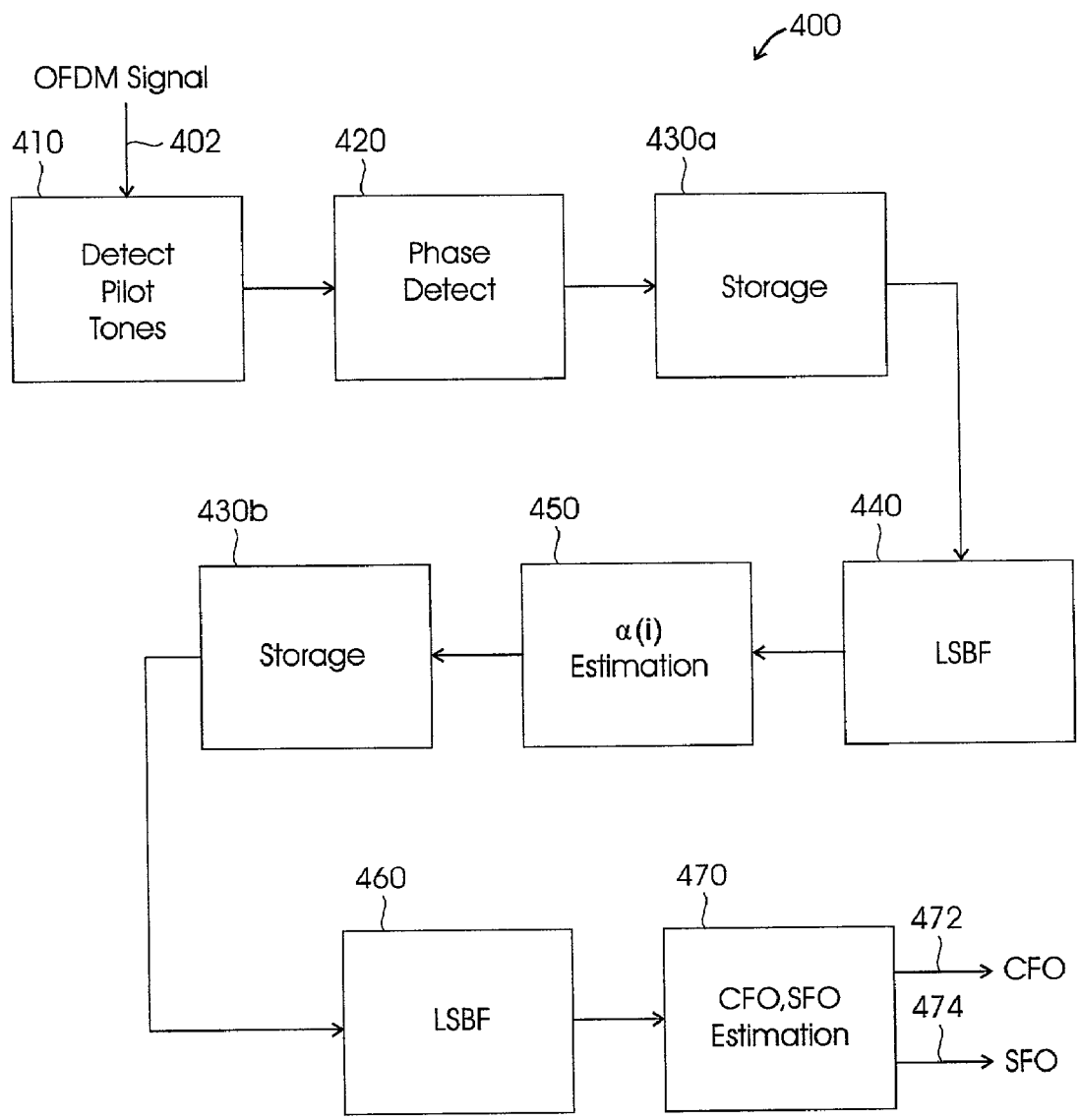
FIG. 4 is a block diagram of a system for estimating carrier frequency offset (CFO) and sampling frequency offset (SFO), in accordance with the invention.

FIG. 4 is a block diagram of a system 400 for estimating CFO and SFO in an OFDM system. An OFDM signal 402 is first processed in a pilot tone detection block 410 to isolate the pilot tones in the OFDM stream. In a phase detection block 420, the absolute phases of the pilot tones are measured at each symbol time of the OFDM stream, and the resulting absolute phase measurements are stored in a storage block 430a. A Least Squares Best Fit (LSBF) to a straight light is next performed on the stored absolute phase measurements for each of the pilot tones in first LSBF block 440, yielding a slope and an intercept for the straight line. In an estimation block 450, the slopes of these lines are used to estimate values of $\alpha(i)$. These estimates are stored in a storage block 430b. (Those of ordinary skill in the art will immediately understand that the two storage blocks 430a and 430b can be implemented as a single storage block with separate storage areas therewithin corresponding to the two storage blocks 430a and 430b). In a second LSBF block 460, the α(i) values are processed to yield a LSBF straight line. Finally, in a CFO/SFO estimation block 470, the slope of the LSBF straight line taken from the α(i) values is used to estimate CFO 472 and the intercept is used to estimate SFO 474 as described hereinabove.

By operating on multiple measurements and by operating directly on the phase angle, rather than on phase angle differences, the present inventive technique is considerably less susceptible to instantaneous noise than prior art techniques. Further, by using weighted least-squares techniques, measurements corresponding to weak signals are de-emphasized, while measurements corresponding to strong signals are emphasized. Since weak signal measurements tend to be less accurate and more noise prone, the de-emphasis of weak signal measurements in favor of stronger signal measurements produces better estimates of CFO and SFO.

Although the invention has been described in connection with various specific embodiments, those skilled in the art will appreciate that numerous adaptations and modifications may be made thereto without departing from the spirit and scope of the invention as set forth in the claims.

For example, the invention has been described with respect to an OFDM communications system, such as IEEE 802.11a or HiperLAN/2, both of which implement OFDM similarly with regard to a plurality of pilot tones having frequencies which are symmetrically disposed about (i.e., above and below) a reference frequency ("zero frequency", or "center frequency"). This symmetry allows the phase cancellation effect to occur when adding the pilot tones together, as described hereinabove. In a case where all of the carriers (and pilot tones) are disposed above the reference frequency—in other words, where all of the "i" subcarrier numbers are either zero or positive—one having ordinary skill in the art to which this invention most nearly pertains would recognize that it would be necessary to analyze the plurality of pilot tones about another (e.g., virtual) reference frequency about which the pilot tones are symmetrically disposed, to achieve a similar phase cancellation effect, based on the description of the invention which is set forth hereinabove. It should also be clear to one having ordinary skill in the art that the pilot tones need not be symmetric, although this increases the complexity needed to implement the invention.

What is claimed is:

1. A method for using estimated carrier frequency offset (CFO) and sampled frequency offset (SFO) in an Orthogonal Frequency Division Multiplexing (OFDM) communications system having a plurality of pilot tones, comprising:
   measuring phases of each of the pilot tones for a number (n) of symbol times;
   for each of the pilot tones, estimating the slope of a phase angle change from symbol time to symbol time using a fit of the measured phases to a straight line;
   determining a best-fit straight line to find an estimated phase angle differential value (α(i)) for each pilot tone;
   wherein a slope of the best-fit straight line yields an estimate of the SFO, and an intercept with the best-fit straight line yields an estimate of the CFO; and
   compensating the estimated SFO and CFO at an OFDM receiver for effective communication in the OFDM communication system.

2. The method of claim 1, wherein:
   the plurality of pilot tones have frequencies which are symmetrically disposed about a reference frequency.

3. The method of claim 1, wherein:
   there are four pilot tones.

4. The method of claim 1, wherein:
   the OFDM communications system is a wireless LAN (WLAN).

5. The method of claim 1, wherein:
   the fit of measured phases to a straight line is provided using a best least squares fit.

6. The method of claim 5, wherein:
   the best-fit straight line is determined using a weighted least-squares best-fit.

7. A method for using estimated carrier frequency offset (CFO) and sampled frequency offset (SFO) in an Orthogonal Frequency Division Multiplexing (OFDM) communications system having a plurality of pilot tones, comprising:
   making phase angle measurements for each of the pilot tones over a number (n) of symbol times;
   calculating a least-squares best-fit (LSBF) straight line for each of the pilot tones;
   determining the slopes of the LSBF straight lines;
   using the slopes of the LSBF straight lines to estimate phase angle differential values for each pilot tone;
   using the estimates of phase angle differential values, producing a weighted LSBF straight-line, wherein the weighting is based upon a strength of the phase angle differential values estimates;
   using the slope of the weighted LSBF straight line, estimating the SFO;
   using the intercept of the weighted LSBF straight line, estimating the CFO; and
   compensating the estimated SFO and CFO at an OFDM receiver for effective communication in the OFDM communication system.

8. The method of claim 7, wherein:
   the plurality of pilot tones have frequencies which are symmetrically disposed about a reference frequency.

9. The method of claim 7, wherein:
   there are four pilot tones.

10. The method of claim 7, wherein:
    the OFDM communications system is a wireless LAN (WLAN).

11. Apparatus for using estimated carrier frequency offset (CFO) and sampled frequency offset (SFO) in an Orthogonal Frequency Division Multiplexing (OFDM) system having a plurality of pilot tones, comprising:
    means for determining the phases of each of the pilot tones for a plurality of symbol times "n";
    means for estimating, for each of the pilot tones, the slope of the phase angle change from symbol time to symbol time by using a best least-squares fit of the measured phases to a first straight line, wherein the slope of the first straight line produces an estimate of α(i);
    means for determining a weighted least-squares best-fit to a second straight line from the estimated α(i) values, said second straight line having a slope and an intercept, such that the slope of the best-fit straight line yields an estimate of the SFO, and the intercept yields an estimate of the CFO; and
    means for compensating the estimated SFO and CFO at an OFDM receiver for effective communication in the OFDM communication system.

12. The apparatus of claim 11, wherein:
    the plurality of pilot tones have frequencies which are symmetrically disposed about a reference frequency.

13. The apparatus of claim 11, wherein:
    there are four pilot tones.

14. The apparatus of claim 11, wherein:
    the OFDM communications system is a wireless LAN (WLAN).

* * * * *